June 25, 1968     H. C. GEEN ET AL     3,390,106
CELLULAR PRODUCTS
Original Filed April 5, 1963
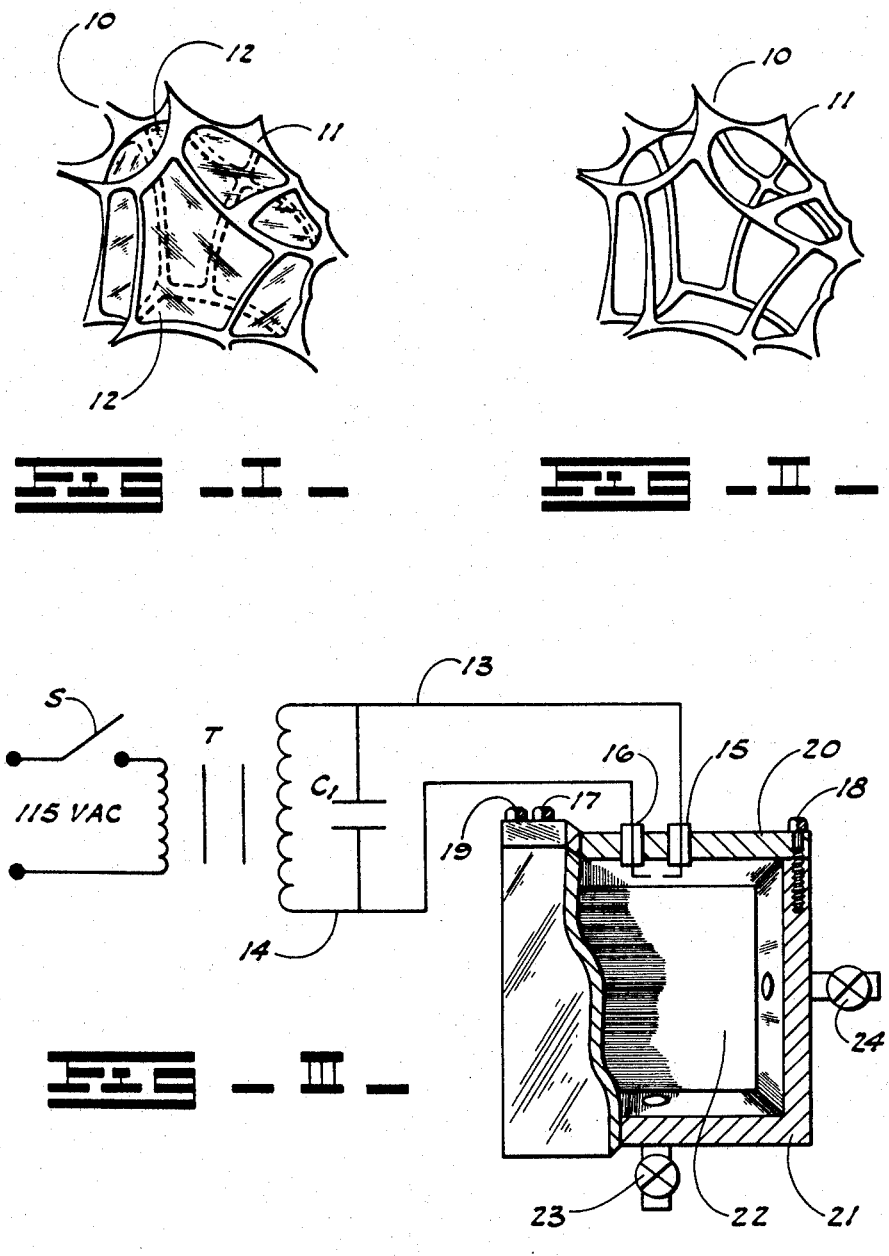
INVENTORS
HENRY C. GEEN
WARREN A. RICE
BY
ATTORNEYS

United States Patent Office 3,390,106
Patented June 25, 1968

3,390,106
CELLULAR PRODUCTS
Henry C. Geen, Ann Arbor, and Warren A. Rice, Dexter, Mich., assignors to Chemotronics, Incorporated, Ann Arbor, Mich., a corporation of Michigan
Original application Apr. 5, 1963, Ser. No. 271,031, now Patent No. 3,175,025, dated Mar. 23, 1965. Divided and this application Jan. 18, 1965, Ser. No. 426,287
The portion of the term of the patent subsequent to Mar. 23, 1982, has been disclaimed
4 Claims. (Cl. 260—2.5)

This application is a division of our application Ser. No. 271,031, filed Apr. 5, 1963, for Process for Bonding and/or Reticulation, now United States Patent No. 3,175,025.

This invention relates to a process for the bonding of and/or the reticulation af various materials. Further, this invention relates to a novel process for producing reticulated cellular materials of many different kinds and in particular to a process for producing reticulated polyurethane materials. Further still, this invention relates to novel products produced by the process of the present invention and in particular to novel reticulated polyurethane products.

There are many cellular materials which are well known to the prior art. These cellular materials consist of numerous individual cells which generally are constructed of a three dimensional skeletal structure of interconnected strands with membranes or windows joined to the skeletal structure such that they partition contiguous cells. The skeletal structure in these cellular materials is usually considerably thicker than the membranes or windows.

The cellular materials, particularly the organic cellular materials, produced by the prior art have found wide usage. The organic cellular materials have been found to be particularly useful in upholstering and garment applications. However, in many instances it has been found to be particularly advantageous to have the windows or membranes in these organic cellular materials removed, thereby producing a reticulated material, in order to improve their texture and breathing ability.

Thus, in recent years there has been increased demand for reticulated organic materials which are organic cellular materials which have the cell membranes or windows removed. The reticulated inorganic cellular materials are unknown to the prior art. In these reticulated organic materials the primary support for the material is supplied by the skeletal structure since the cell membranes are removed. Examples of such reticulated organic materials used by the prior art are the membrane destroyed or reticulated polyurethane materials which are used in various filtering and detraining applications and as garment liners.

In the area of reticulated organic materials, the prior art has concerned itself almost exclusively with the production of reticulated polyurethane materials, especially reticulated polyester polyurethane materials. One reason for this is that a process has not been developed which will effectively reticulate the other kinds of organic cellular materials.

An example of a prior art process for reticulating cellular polyurethane materials is one which utilizes a hydrolyzing agent such as an aqueous solution of sodium hydroxide to remove the cell membranes. While the process effectively products a reticulated polyurethane material, there are a number of disadvantages. There are numerous time consuming, and thus expensive, steps in this process, including the neutralization of the hydrolyzing agent after application and the washing and drying of the reticulated polyurethane product. Further, this process works well only with the flexible polyester polyurethane cellular materials. Thus, relatively expensive reticulated polyurethane materials are produced by this process.

Another problem which the prior art has attempted to solve is a means of utilizing scrap or wastage from the trimming of polyurethane cellular materials. The prior art in this instance utilizes an adhesive to bond the scrap or wastage into an integral product. However, this method of bonding the pieces of polyurethane material together has a number of disadvantages. First, the adhesive is expensive and contributes very materially to the cost of the product. Second, the steps of applying and curing the adhesive are time consuming and thus expensive. Third, the product is changed in physical properties by comparison to the starting material because of the addition of the adhesive and thus the product is unsuitable for many applications.

It is therefore an object of the present invention to provide a process for producing reticulated materials of many different kinds and in particular to provide a process for producing reticulated polyurethane materials.

Further, it is an object of this invention to provide novel reticulated materials, in particular novel reticulated polyurethane materials, produced by the process of the present invention.

Further, it is an object of the present invention to provide a process for bonding materials together, in particular polyurethane materials, without the use of an adhesive, thereby producing novel, integral products which do not have the limitations imposed by an adhesive.

Further still, it is an object of the present invention to provide a bonding and/or reticulating process which is simple and economical.

These and other objects will become increasingly apparent to those skilled in the art as the description proceeds and by reference ot the drawings.

In the drawings:

FIGURE I is a front view of an individual polyurethane cell, in a cellular polyurethane material, illustrating the skeletal structure and cell membranes.

FIGURE II is a front view of an individual reticulated polyurethane cell illustrating the skeletal structure shown in FIGURE II after the removal of the cell membranes.

FIGURE III is a schematic view of the equipment used in the preferred process of the present invention.

The objects of the present invention are accomplished by providing a process for the bonding of and/or the reticulation of materials which comprises providing a combustible mixture of an oxidizer material and an oxidizable material within pieces of a cellular or around pieces of a non-cellular material and igniting the combustible mixture thereby producing an integral, bonded and/or reticulated material. The preferred oxidizer material is oxygen and the preferred oxidizable material is natural gas. Novel products are produced by the foregoing process of the present invention. The process of the present invention is especially adapted to the reticulation of cellular polyurethane materials thereby producing novel reticulated polyurethane products.

Many different types of cellular organic materials were reticulated by the process of the present invention. The manufacture of these materials is well known to the prior art. Since the polyurethane cellular materials are widely used commercially and these are the preferred starting materials in the process of the present invention, the method of preparation of some of these materials by the prior art is set forth herein in detail.

Foamed or cellular polyurethane products are conventionally made by reacting an organic isocyanate, e.g. a polyisocyanate, with a polyol or a polyester along with various other materials. A gas or vapor is usually generated in situ while the reaction mixture remains in the plastic or fluid state. The generation of this gas results in the formation of bubbles, approximately spherical in form, in the plastic material. As these bubbles expand, cells are formed and the resulting structure of the material is comprised of a skeletal structure and cell membranes.

Illustrative of a common prior art method of preparation of a flexible polyester polyurethane cellular material is Example I.

EXAMPLE I

Step A

Into a closed container, equipped with an agitator and means for maintaining a nitrogen gas sweep, were charged, at room temperature, 50 parts by weight of an approximately 80:20 isomeric mixture of toluene-2,4-diisocyanate and toluene-2,6-diisocyanate and 50 parts by weight of a polyester resin (alkyd) (Paraplex U-148 sold by Rohm & Haas Company, Philadelphia, Pa.), having the following properties:

| | |
|---|---|
| Average molecular weight | 1800–2000 |
| Equivalent weight | 745–830 |
| Hydroxyl number | 64–75 |
| Acid number max | 3 |
| Water content max | 0.25% |
| Average hydroxyls per molecule | 2.42 |

The above-described mixture was agitated under a maintained nitrogen atmosphere for four hours, the temperature rising to approximately 32° C.

Step B

Eighty (80) parts by weight of the polyester resin (alkyd) referred to in step A above, 0.6 part by weight of a polyoxyethylated vegetable oil dispersing agent (Emulphor 719 sold by General Aniline and Film Corporation, New York City, N.Y.), 4.5 parts by weight of water and 1.9 parts by weight of diethylethanol amine were blended at room temperature.

Step C

One hundred (100) parts by weight of the reaction mixture of Step A were added to 87 parts by weight of the reaction mixture of Step B and thoroughly mixed for about 20 seconds at a starting temperature of about 25° C. The mixture was then immediately poured into a container of sufficient volume to permit expansion. After about 15 minutes the product set into a cellular mass, the temperature rising to about 75° C. The container together with the foamed cellular mass was placed in an oven and held at about 70° C. for approximately 16 hours. The product, a flexible polyester polyurethane resin, was in the form of a cellular or foamed material which was then removed from the container and cut into blocks. Materials prepared in this manner have been successfully used in the process of the present invention.

Another conventionally prepared polyurethane resin is the flexible, polyalkylene ether polyurethane cellular material. Illustrative of the method of preparation of a common type is Example II.

EXAMPLE II

Step A

Into a closed, agitated vessel, equipped with a nitrogen gas sweep were charged, at 40° C., 100 parts by weight of a molten polyalkylene ether having a hydroxyl number of 37.6, water content of 0.04%, and melting point of about 35° C., identified as "Teracol 30" which is believed to be a 1,4-polybutylene ether glycol (E. I. Dupont and Company, Inc., Wilmington, Delaware), and 12.6 parts by weight of the toluene-2,4- and 2,6-diisocyanate (80:20 mixture employed in Example I). There was a mildly exothermic reaction, the temperature rising to about 45–50° C. Heat was then applied and the mixture was maintained at 60° C. for two and one-half hours. An additional 12.6 parts of the isomeric diisocyanate mixture was then added and the temperature was raised and maintained at 140° C. for an additional two and one-half hours. The charge was then cooled to 50° C. and a further 3.7 parts by weight of the isomeric mixture of the diisocyanate was added to the reaction mixture. Finally, the product was allowed to cool to room temperature of about 25° C.

Step B

A blend, at 30° C. was prepared of 51 parts by weight of dioctyl sebacate, a plasticizer-softener; 10 parts by weight of n-methyl-morpholine and 2.5 parts by weight of triethylamine catalyst; 5.0 parts by weight of a conventional silicone foam stabilizer (Dow Corning DC-200, dimethyl polysiloxane fluid, 50 csts.); and 22.5 parts by weight of water.

Step C

To the reaction mixture of Step B were added 1000 parts by weight of the reaction mixture of Step A, and the mixture was stirred rapidly for about 20 seconds. Immediately thereafter the mass was poured into a container of sufficient volume to permit expansion; and after about 30 minutes the container together with the foamed mass was placed in an oven and maintained at 70° C. for about 16 hours. The product was a polyalkylene ether polyurethane resin in the form of an open cellular structure which was removed from the container and cut into blocks. Materials made in this manner were also used in the process of the present invention.

The polyurethane materials produced by the processes of Examples I and II have a surface skin of an essentially non-cellular polyurethane material when they are removed from the mold. In most instances, the skin was trimmed from the product before use in the process of the present invention. However, as will be seen, it is advantageous in certain instances to use this unskinned product, having only two opposing ends trimmed to expose the cellular polyurethane material, in the process of the present invention.

Examples I and II illustrate conventional processes for the preparation of polyester and polyether polyurethane cellular materials utilized by the prior art. These and other polyurethane materials (e.g., the so-called "one-shot" polyether polyurethanes) were treated by the process of the present invention. It will be appreciated that there are many different types of cellular polyurethane materials. These will be rigid, semi-rigid or flexible depending upon the starting materials used. There are many variations in the isocyanate materials used. These isocyanate materials were reacted with many different materials containing an active hydrogen to produce a cellular polyurethane material. Further, it will be appreciated that Examples I and II are only illustrative of conventional processes of preparation of cellular polyurethane materials. The production of cellular polyurethane materials of isocyanate derived polymers of various types is well understood in the polymer art and is described for example in "German Plastics and Practice," published by De Bell and Richardson 1946, chaper 21, "Plastic Foams," pages 462–465; "Papers Presented at the Atlantic City Meeting: Synthesis of Isocyanate Polymers," published by the American Chemical Society, Division of Paints, Plastics and Printing Ink Chemistry, September 1956; and in the patent literature.

Cellular materials (organic or inorganic) having interconnected cells and having a melting point, or volatilization temperature, at or below the flame temperature of the particular combustible mixture used, can be employed as starting materials to produce reticulated materials by the process of the present invention. The interrelated factors determining whether a cellular material can be reticulated are: the volatilization, decomposition, depolymerization and/or melting temperatures of the material being reticulated; the flame temperature of the combustible mixture employed (which must be at least equal to the volatilization, decomposition, depolymerization and/or melting temperature of the material being reticulated); the relationship between the heat capacity of the membranes in the cellular material and the heat capacity of the intersections or strands formed at the junctures of two or more membranes; the heat-transmissive properties of the material being reticulated; and the caloric value of the combustible mixture which must be sufficient to raise the temperature of the membranes to the destruction point without being sufficient to also destroy the strands, taking into account the specific heat and thermal conductivity of the material being reticulated and the time-temperature curve of the combustion. Within the limitations imposed by these factors the following materials, for example, can be treated by the process of the present invention: organic expanded materials such as polystyrene, polyethylene, vinyl resin (plasticized poly (vinyl chloride)), cellulose acetate, natural rubber and synthetic rubber cellular materials; and inorganic expanded materials such as metal foams and glass foams.

The preferred cellular materials used to produce the reticulated materials of the present invention are the polyurethane cellular materials. FIGURE I illustrates an individual cell 10 in a polyurethane cellular material produced by the processes of Exampes I and II. It comprises a skeletal structure 11 and cell membranes 12. The skeletal structure 11 supports the cell membranes 12 and the combination forms an individual cell 10. When the cell membranes 12 are removed, a reticulated material is produced. FIGURE II illustrates the cell 10 shown in FIGURE I after complete reticulation. Only the skeletal structure 11 is left after reticulation.

The preferred process of the present invention and the products produced thereby is illustrated by the following Examples III-VIII. Further, the preferred process for reticulating cellular polyurethane materials and the novel products produced thereby is particularly illustrated.

EXAMPLE III

Referring to FIGURE III a rectangular shaped container 21 open on one side and having inside dimensions of 3⅛ inches by 11½ inches by 15 inches was fitted with a cover 20. The container 21 and the cover 20 were made of steel and bolted together by bolts 17, 18 and 19 spaced 1 inch apart around the cover 20. The container 21 and cover 20 were fitted together to form an airtight enclosed chamber 22. Valved inlet and outlet tubes 23 and 24 were fitted to the container 21. A pair of spark gap terminals 25 and 26 were fitted through the cover 20 and insulated therefrom by insulators 15 and 16. The spark gap terminals 25 and 26 were connected through conductors 13 and 14 to the high side (15,000 volts) of a transformer T. A capacitor $C_1$, matched to the secondary of the transformer, was provided in electrical parallel with the high side of the transformer T and between conductors 13 and 14. The low side of the transformer T was connected to a 115 volt alternating current source and a switch S was provided in this circuit.

A sample of cellular polyurethane material, having approximately the same dimensions as the chamber 22 formed by the container 21 and cover 20, was positioned in the chamber 22. The sample was a charcoal colored, flexible polyester polyurethane cellular material of about two pounds per cubic foot density, and contained about 45 cells per linear inch. The cover 20 was bolted to the container 21 thereby forming a sealed chamber 22. No void spaces were present between the sample and the sides of the container 21 and the inside of the cover 20.

Air was removed from the sample and chamber 22 using a conventional vacuum pump attached to the opened tube 23 with the tube 24 closed. The pressure was reduced to about 0.1 mm. of mercury and the tube 23 closed. A 2:1 mixture by volume of oxygen and natural gas (about 90% methane and about 10% diluents and other lower alkanes) respectively, at room temperature was introduced into the evacuated chamber through tube 23 to a pressure of ½ an atmosphere absolute. This tube 23 was then closed.

A spark was initiated between the spark gap terminals 25 and 26 inside the chamber 22 by closing the switch S and the gaseous mixture in the chamber 22 and within the sample was ignited. The gaseous mixture had a fuel value of about 165 B.t.u.'s per cubic foot.

After combustion was complete, gaseous combustion products were removed by flushing the chamber 22 and sample with clean air with the valved tubes 23 and 24 open. The sample was then removed from the chamber 22 and examined.

It was found that the sample was completely reticulated. The sample was essentially the same charcoal color and was not damaged by the combustion of the gas mixture.

The process of Example III was repeated using polyester polyurethane cellular materials having a larger number of cells per inch. Illustrative is Example IV.

EXAMPLE IV

The process of Example III was repeated using a flexible polyester polyurethane sample, which contained about 60 cells per linear inch and which was light green in color.

The chamber 22 was evacuated and filled with a 2:1 by volume mixture of oxygen and natural gas, respectively, to ⅔ of an atmosphere pressure absolute at room temperature.

The gaseous mixture was ignited thereby causing combustion. The gaseous mixture had a fuel energy content of about 220 B.t.u.'s per cubic foot.

The sample was removed from the chamber 22 and examined, after first flushing with clean air to remove combustion products. It was found that the sample was completely reticulated. In all other respects the sample was comparable to that produced in Example III.

The process of Example III was repeated using an about 100 cell per inch polyester polyurethane cellular material. Illustrative is Example V.

EXAMPLE V

The process of Examples III and IV was repeated using a pink colored, flexible polyester polyurethane cellular material containing about 100 cells per linear inch. A 2:1 by volume oxygen to natural gas mixture was introduced into the chamber 22 to one atmosphere of pressure absolute and at room temperature. The fuel mixture was ignited and had an energy content of about 332 B.t.u.'s per cubic foot.

The sample was removed from the chamber 22 and it was found that it was completely reticulated. The product was comparable in all respects to that produced in Example III.

The process of Example III was repeated using a polyester polyurethane cellular material with fewer cells per linear inch. Illustrative is Example VI.

EXAMPLE VI

The procedure of Example III was repeated using a tan colored, flexible polyester polyurethane cellular material which contained about 10 cells per linear inch.

The chamber 22 was evacuated and filled with a 2:1 by volume mixture of oxygen and natural gas, respectively, to ½ of an atmosphere pressure absolute at room temperature.

The gaseous mixture was ignited thereby causing combustion. The gaseous mixture had a fuel energy content of about 165 B.t.u.'s per cubic foot.

The sample was removed from the chamber 22 and examined, after first flushing with clean air to remove combustion products. It was found that the sample was completely reticulated. In all other respects, the sample was comparable to that produced in Example III.

The process of Example III was repeated using a flexible polyether polyurethane cellular material. Illustrative are Examples VII and VIII.

EXAMPLE VII

The procedure of Example III was repeated using a yellow colored, flexible, prepolymer type polyether polyurethane celluar material, having cells ranging between about $\frac{1}{20}$ inch to about $\frac{1}{100}$ inch in diameter with a random distribution of cell sizes. The chamber 22 was charged with a 2:1 by volume mixture of oxygen and natural gas, respectively, at one atmosphere of pressure absolute and room temperature and ignited. The energy value of the fuel was about 332 B.t.u.'s per cubic foot.

After blowing clean air through the sample it was removed from the chamber 22 and examined. It was found that the sample was completely reticulated. It was found that the sample was comparable in all respects to that produced in Example III.

EXAMPLE VIII

The process of Example VII was repeated using a flexible, white "one shot" polyether polyurethane, having cells about $\frac{1}{100}$ inch in diameter. The chamber 22 was charged to one atmosphere of pressure absolute with a 2:1 oxygen to natural gas mixture at room temperature.

The gaseous mixture was ignited, thereby causing combustion. The gaseous mixture had a fuel energy content of about 332 B.t.u.'s per cubic foot.

The sample was removed from the chamber 22 and examined, after first flushing with clean air to remove combustion products. It was found that the sample was completely reticulated. In all other respects, the sample was comparable to that produced in Example III.

The process of Example III was repeated using different types of cellular polyurethane materials including semi-rigid and flexible cellular polyurethane materials and cellular polyurethane materials containing flame or fire retardants or germicides and it was found that they were easily reticulated by the process of the present invention. In particular, it was found that all cell sizes and colors and compositions of the cellular polyurethane materials could be treated by the process of the present invention to produce a reticulated material. Further, it was found that the density loss upon recticulation was very small, generally much less than 2% of the original weight.

It was found that optimum results were achieved when the sample completely filled the chamber, as in Examples III–VIII, thereby eliminating the void spaces between the walls of the container and cover. It was found that this reduced or eliminated the effects of the detonation or shock waves which might occur from the combustion of the gaseous mixture. These detonation or shock waves have a tendency to deform the sample. It was found that when the sample was deformed by combustion of the gaseous mixture, it was permanently buckled.

A further method of eliminating or reducing the effects of the detonation or shock waves from the combustion of the gaseous mixture was to position the spark discharge device in the center of the cover. This provided a means of relatively uniformly distributing the instantaneous pressures developed within the chamber. A means of substantially eliminating the effects of the detonation or shock waves was to provide a hypodermic needle inserted to the geometrical center of the sample and connected to the spark discharge device so that the spark initiated combustion had to proceed through the needle to reach the fuel mixture within the cellular foam. When this tube was filled with the gaseous mixture, the combustion was found to originate in the geometrical center of the sample and the effect of the detonation or shock waves was virtually eliminated. A means of minimizing the effect of detonation or shock waves is to use only enough fuel mixture to accomplish reticulation, without having present a large excess of the combustible mixture throughout the cellular material.

The preferred process of Examples III–VIII illustrate the use of a rigid container for the reticulation of cellular organic materials. It was found that non-rigid containers could be used in the process of the present invention. Illustrative are Examples IX and X.

EXAMPLE IX

An about 45 cell per inch, blue colored, flexible polyester polyurethane cellular sample, measuring 15 inches by 56 inches by 72 inches and having a covering skin except at its two opposing ends, was used in this Example. The sample was positioned in a thin film (0.008" thick) polyethylene bag which was open at one end. A two inch steel pipe was sealed into the opening of the polyethylene bag, thus closing the opening. The pipe had a spark plug mounted on its side and was electrically connected as in Example III. The end of the pipe opposite the polyethylene entry end was provided with a valved inlet tube.

The polyethylene bag and sample were then evacuated of air and 2:1 by volume mixture of oxygen and natural gas, respectively, was introduced into the polyethylene bag at atmospheric pressure until the sample was completely and uniformly charged with the fuel mixture. The gaseous mixture was then ignited by means of the spark plug causing the combustion of the gases. The combustion of the gases caused the polyethylene bag to tear apart and there was a loud noise produced by the combustion. The sample was then flushed with air to remove combustion products.

The sample was then examined and it was found to be completely reticulated. It was found that the product was comparable to that produced in Example III.

EXAMPLE X

The procedure and equipment of Example IX was used in this example. A green colored, skinned, flexible polyester polyurethane having 30 cells per linear inch and measuring 15 inches by 48 inches by 48 inches was placed in the polyethylene bag. After evacuation of the bag, the pressure was adjusted to one atmosphere absolute by introducing about 14 volumes of a mixture of air and oxygen (300 volumes of air mixed with 250 volumes of oxygen at room temperature and at atmospheric pressure) along with about 4.2 volumes of natural gas at room temperature.

The gaseous mixture was ignited thereby causing combustion. The gaseous mixture had a fuel energy content of about 220 B.t.u.'s per cubic foot.

The resulting product was flushed with clean air to remove combustion products. It was found that the sample was completely reticulated. In all other respects, the sample was comparable to that produced in Example III.

Air was used to dilute the oxygen-natural gas mixture in Example X in order to prevent the destruction of the sample. It was found that when a mixture of just oxygen and natural gas, under the identical conditions of Example X, was used, that the sample was destroyed. Thus, the dilution of the oxygen-natural gas mixture with air provided an easy means of regulating the energy of the fuel mixture.

The process of Examples IX and X was repeated using many different samples containing a greater or lesser number of cells per inch. It was found that the product was comparable to that produced in Examples III to VIII. Further, many different flexible and semiflexible polyether and polyester polyurethane materials in a variety of colors were reticulated by the process of Examples IX and X with good result.

The process of Examples IX and X is not preferred because of the loud noise produced by the combustion of the gaseous mixture and because of the rupture of the flexible container upon ignition. Thus, the process of Examples III–VIII is preferred.

Natural gas is the preferred oxidizable material because of its relatively low cost and ease of availability;

however, many other oxidizable materials are suitable. In particular, lower alkanes, containing 1 to 10 carbon atoms, individually or in mixture can be used and these are the preferred oxidizable materials. Other oxidizable materials which can be used are for instance: hydrogen, ammonia, hydrazine, hydrogen sulfide and various hydrocarbons such as acetylene and ethylene. It will be appreciated that liquid oxidizable materials can be used simply by heating them to the gaseous state before introduction into the chamber or by heating after introduction into the chamber or by introducing them at pressures sufficiently low to cause them to volatilize at the ambient chamber temperatures. It is also possible to use liquid oxidizable materials. The oxidizable materials which are solid under the operating conditions are least preferred because of the difficulty of introducing them into the sample.

Suitable oxidizer materials are for instance, oxygen, ozone and the various perchlorates. It will be appreciated however, that oxygen is preferred. Further, it is preferred to use oxidizer materials which are gaseous at room temperature such as oxygen or oxygen enriched air.

Illustrative of the use of other oxidizable materials besides natural gas are Examples XI and XII.

EXAMPLE XI

The procedure of Example III was used. Also, an identical sample was used. In this example, hydrogen was used as the oxidizable material in a 2:1 by volume mixture with oxygen. The gaseous mixture was introduced into the chamber 22 to one atmosphere of pressure. The gaseous mixture was ignited as in Example III.

It was found that the sample was completely reticulated.

EXAMPLE XII

The procedure of Example III was used as well as an identical sample. After evacuation of the chamber 22, white gasoline was introduced into the chamber 22 through an inlet valve (about 0.2 cc. of gasoline per 930 cc. volume of container) along with oxygen at atmospheric pressure and room temperature. The resulting mixture was gaseous. The mixture was ignited as in Example III.

It was found that the sample was completely reticulated.

The process of the present invention was used to reticulate organic cellular materials with widely varying cell sizes. It was found that as the number of cells per linear inch in the cellular material increased, the energy content of the combustible mixture per unit volume had to be greater. It is believed that this is because of the proportionately greater ratio of the cell surface area to cell volume of the smaller cells. It was found that the energy produced upon combustion was easily regulated by adjusting the pressure of the gaseous mixture in the chamber. This can be seen from Examples III–VIII. It was further found that the energy produced upon combustion could be easily reticulated by the use of gaseous diluents. This is seen in Example X. It was further found to be desirable to use only the minimum amount of energy necessary to cause reticulation to minimize problems with buckling. All of these process variations are within the skill of the art and are intended to be included in the scope of the present invention.

The ignition of the combustible gas mixture can be accomplished by any convenient means. Spark devices such as spark plugs may be used as well as the spark gap terminal illustrated in FIGURE III. In certain instances, simultaneous multiple ignition at different points around the chamber spaced at least about six inches apart was found to be advantageous. It was found that the ignition of the gaseous mixture could be accomplished by the use of a high energy light pulse by introducing nitrogen dioxide or alkyl nitrites into the chamber and providing a means for introducing the light into the chamber. It was found in certain instances that a more homogeneous initiation of combustion of the gases in the chamber was achieved by this method, thereby reducing the detonation or shock waves resulting from the combustion.

The process of the present invention is adaptable to reticulating all different sizes and shapes of cellular materials. For instance, it was found that a polyurethane sample measuring 15 inches by 56 inches by 72 inches was easily reticulated by the process of the present invention. This is shown in Example IX. In certain instances, it is preferred to leave the skin on the sample to prevent contamination of the underlying polyurethane cellular material due to handling. This is also seen in Example IX.

The process of the present invention can be used to bond pieces of thermoplastic materials together. Further, the process of the present invention can be used to bond pieces of cellular materials as well as to reticulate them at the same time. By use of the process of the present invention, a bonded product can be produced simply and economically. Illustrative is Example XIII.

EXAMPLE XIII

The equipment used in Example III was used. The chamber 22 was filled with 269 grams of one-shot type polyether polyurethane scrap of different colors. The chamber 22 was evacuated down to 28 inches of mercury and then charged to one atmosphere absolute with a 2:1 mixture by volume of oxygen and natural gas, respectively, at room temperature.

The gaseous mixture was ignited thereby causing combustion. The gaseous mixture had a fuel energy content of about 332 B.t.u.'s per cubic foot.

The product was removed from the chamber 22 and examined, after first flushing with clean air to remove the combustion products. It was found that the pieces of the polyurethane were bonded together to form an integral product and that the product was totally reticulated. It was further found that the product had a density of 2.4 pounds per cubic foot.

The process of Example XIII was repeated with the pieces of polyurethane compacted into the chamber. It was found that the pieces of the polyurethane were strongly bonded together and that the product was completely reticulated. The process of Example XIII was repeated using polyurethane cellular materials of all types. It was found in all instances that the pieces of polyurethane material were bonded together. The process of Example XIII was repeated using pieces of many different kinds of materials, both organic and inorganic and cellular and non-cellular, with good results.

The product from the bonding of pieces of material by the process of the present invention finds a ready market. Further, this process provides a means of utilizing waste resulting from the trimming of cellular materials or reticulated materials. In conventional polyurethane cellular material trimming operations, there is about a 20% wastage in scrap. Thus, the process of the present invention provides a means of economically and simply bonding together scrap cellular or reticulated polyurethane to produce a marketable product.

A further advantage of the bonding process is that the final product can be formed or molded to any desired shape conforming to the chamber used. Thus, consumer specifications as to shape can easily be met by the use of the process of the present invention.

The product of Examples III–XIII was checked for density loss resulting from reticulation by the process of the present invention and compared to the prior art reticulated products. It was found that the density loss caused by the process of the present invention was much less than 2.0% in all samples. The reticulated polyurethanes produced by the prior art methods were found to have a consistently high density loss of about 5.0% or more. Thus, the reticulated materials produced by the process of the present invention have a density loss less than one-half of those produced by the prior art processes. Since the density loss comes from the decrease in weight of the sample rather than volume, a tremendous saving of polyurethane material is achieved by the process of the present invention, especially in large volume production. Further, it was found that the reticulated polyurethane products of the present invention had superior physical properties possibly because of the fire polishing of the skeletal structure remaining after reticulation by the combustion of the gaseous mixture.

The improved properties are illustrated in the following Tables II–VIII. All of the testing was done by methods standard in the polyurethane foam industry. The various materials tested are set forth in Table I.

TABLE I.—MATERIALS

| Sample Number | Material | Pore Size | Color |
|---|---|---|---|
| 1 | Polyester polyurethane | 10 | Charcoal. |
| 2 | do | 20 | Beige. |
| 3 | do | 100 | Pink. |
| 4 | do | 10 | Yellow. |

TABLE II

[Density, pounds/cubic foot]

| Sample Number | Untreated Control | Treated by Process of Present Invention |
|---|---|---|
| 1 | 1.74 | 1.64 |
| 2 | 1.82 | 1.84 |
| 3 | 1.72 | 1.69 |
| 4 | 2.77 | 2.78 |

TABLE III

[Tensile strength, pounds/square inch]

| Sample Number | Untreated Control | Treated by Process of Present Invention |
|---|---|---|
| 1 | 11.9 | 21.4 |
| 2 | 19.1 | 28.4 |
| 3 | 36.7 | 51.6 |
| 4 | 10.3 | 13.1 |

TABLE IV

[Elongation, percent]

| Sample Number | Untreated Control | Treated by Process of Present Invention |
|---|---|---|
| 1 | 125 | 325 |
| 2 | 190 | 330 |
| 3 | 320 | 415 |
| 4 | 115 | 240 |

TABLE V

[Tensile modulus,[1] pounds/square inch]

| Sample Number | Untreated Control | Treated by Process of Present Invention |
|---|---|---|
| 1 | 10.9 | 8.4 |
| 2 | 13.4 | 12.2 |
| 3 | 14.4 | 14.2 |
| 4 | 9.9 | 8.2 |

[1] Tensile modulus, defined as the stress necessary to cause unit strain, is a good measure of the stiffness of a foam.

TABLE VI

[Tear strength, pounds/inch]

| Sample Number | Untreated Control | Treated by Process of Present Invention |
|---|---|---|
| 1 | 2.9 | 6.8 |
| 2 | 2.6 | 7.4 |
| 3 | 3.1 | 4.9 |
| 4 | 1.4 | 5.0 |

TABLE VII

[Compression set,[1] percent]

| Sample Number | Untreated Control | Treated by Process of Present Invention |
|---|---|---|
| 1 | 13 | 37 |
| 2 | 11 | 22 |
| 3 | 36 | 22 |
| 4 | 20 | 19 |

[1] Defined as the loss in thickness of a specimen, compressed to 50% o its initial thickness for 22 hours at 158° F., expressed as percent of the compressed distance (ASTM Method B).

TABLE VIII

[Load bearing,[1] pounds/square inch]

| Sample Number | Untreated Control | | | Treated by Process of Present Invention | | |
|---|---|---|---|---|---|---|
| | 25% | 50% | 66% | 25% | 50% | 66% |
| 1 | 1.06 | 1.19 | 1.57 | 0.74 | 0.82 | 1.09 |
| 2 | 0.90 | 0.96 | 1.26 | 0.77 | 0.87 | 1.20 |
| 3 | 1.07 | 1.32 | 2.02 | 0.89 | 0.97 | 1.32 |
| 4 | 0.46 | 0.64 | 1.02 | 0.42 | 0.55 | 0.89 |

[1] Pressure required to compress these specimens the percent indicated

As can be seen by the data set forth in Tables II–VIII the reticulated polyurethane materials of the present invention in most instances have very superior properties when compared to an untreated control. It was further found that aging characteristics are comparable to the untreated controls. It was further found that the reticulated materials of the present invention were likewise superior to the reticulated materials of the prior art.

It will be appreciated from the foregoing examples that the process of the present invention is very rapid. The combustion of the gaseous mixture takes less than a second. The other steps in the process are also rapidly accomplished. There is no drying step as in the prior art process, thus considerably reducing the process time and equipment. These factors very materially contribute to a reduction in equipment and labor costs resulting in a process which is simple and economical.

It will be appreciated that the foregoing description is only illustrative of the present invention and it is intended that this invention be limited only by the hereinafter appended claims.

We claim:

1. The article of manufacture, derived from an interconnected cell organic thermoplastic cellular material with a three dimensional skeletal structure of interconnected strands and with membranes joined to the strands which divide contiguous cells, which comprises: a reticulated material wherein the cell membranes of the cellular material are destroyed by raising the temperature of the membranes to the destruction point without destroying the strands of the skeletal structure and wherein the skeletal structure remaining after destruction of the cell membranes is fire-polished.

2. The article of manufacture of claim 1 wherein the organic thermoplastic cellular material is a polyurethane cellular material.

3. The article of manufacture, derived from contacting pieces of an organic thermoplastic cellular material which comprises a cellular material wherein the pieces of organic thermoplastic cellular material are bonded together by raising the temperature of the contacting pieces to bond them together and wherein the cellular material remaining after the contacting pieces are bonded together is fire-polished.

4. The article of manufacture of claim 3 wherein the organic thermoplastic material is a polyurethane material.

References Cited

UNITED STATES PATENTS

| | | | |
|---|---|---|---|
| 2,917,384 | 12/1959 | Grandey | 106—41 |
| 2,957,793 | 10/1960 | Dickey | 161—190 |
| 3,041,190 | 6/1962 | Griffith et al. | 106—40 |
| 3,171,820 | 3/1965 | Volz | 260—2.5 |
| 3,175,025 | 3/1965 | Geen et al. | 264—80 |

DONALD E. CZAJA, *Primary Examiner.*

LEON J. BERCOVITZ, *Examiner.*

G. W. RAUCHFUSS, H. COCKERAM,
*Assistant Examiners.*